RE 24973

May 17, 1960 W. WELKOWITZ ET AL 2,937,292

SUPPORTING STRUCTURE FOR PIEZOELECTRIC TRANSDUCER

Filed Dec. 9, 1957 3 Sheets-Sheet 1

INVENTORS
WALTER WELKOWITZ
RICHARD D. McGUNIGLE
LOUIS J. PALUSH
BY
Cyrus D. Samuelson
ATTORNEY May 17, 1960 W. WELKOWITZ ET AL 2,937,292

SUPPORTING STRUCTURE FOR PIEZOELECTRIC TRANSDUCER

Filed Dec. 9, 1957 3 Sheets-Sheet 2

INVENTORS
WALTER WELKOWITZ
RICHARD D. McGUNIGLE
LOUIS J. PALUSH

BY Cyrus D. Samuelson

ATTORNEY

INVENTORS
WALTER WELKOWITZ
RICHARD D. McGUNIGLE
LOUIS J. PALUSH
BY Cyrus D. Samuelson
ATTORNEY United States Patent Office 2,937,292

Patented May 17, 1960

2,937,292

SUPPORTING STRUCTURE FOR PIEZOELECTRIC TRANSDUCER

Walter Welkowitz, Metuchen, Richard D. McGunigle, New Brunswick, and Louis J. Palush, Laurence Harbor, N.J., assignors to Gulton Industries, Inc., Metuchen, N.J., a corporation of New Jersey Application December 9, 1957, Serial No. 701,444

6 Claims. (Cl. 310—9.4)

Figure 1:
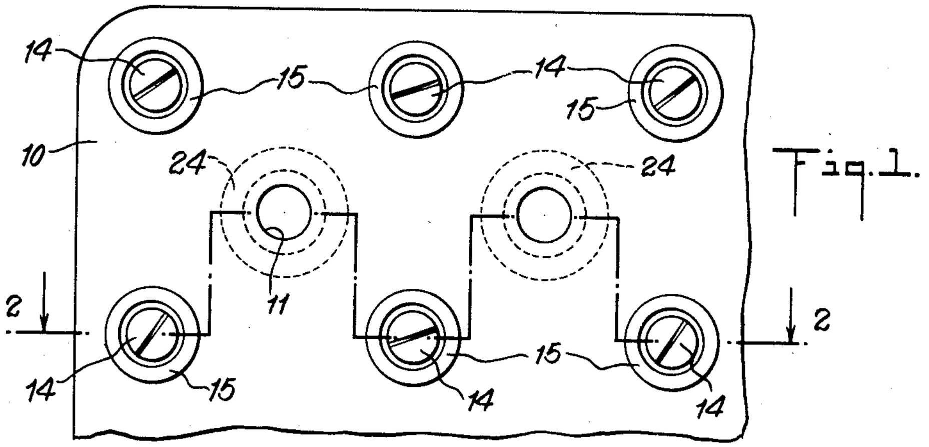

Our invention relates to a supporting structure for holding piezoelectric transducers in contact with a tank, container or other metallic surface. In particular, our invention is directed toward overcoming the inherent disadvantages encountered in the methods of bonding transducers to liquid containers and similar devices. At the same time our invention improves the mechanical ruggedness without loss of acoustical efficiency.

It has been found best to attach piezoelectric ceramic transducers directly to the outside of the container of the liquid to be cavitated. This technique eliminates the need for designing and devising impedance matching networks in order to obtain transmission of ultrasonic energy from the transducer to the liquid medium. In order to insure good coupling between the transducers and the metallic surface it is necessary to use acoustic transmission means such as a bonding agent comprising an epoxy system in which the base resin is combined with a hardener such as, for example, metaphenylene diamine, and inert mineral fillers. Consistency can be controlled by the addition of diluents in a manner well known in the art such as has been described in the article entitled "Where and How to Use Epoxies" by Jerome Formo and Luther Bolstad on pages 99 to 104 of Modern Plastics, July 1955, volume 32, No. 11. The employment of the epoxy resin results in the elimination of any air gaps caused by rough surfaces and other irregularities in the matching surfaces being bonded together. However, since the epoxy resin is the only means by which the transducers are held in contact with the container surface, it must also possess as high a tensile strength as possible without loss of acoustic efficiency. This becomes increasingly difficult as the acoustic power, transducer operating temperature and liquid temperature rise.

Since the operating limit of the epoxy resin is greater in compression than in tension, it is desirable to bias the forces at the bond surface into compression. This relieves the bond of the necessity of holding the transducer attached to the container and permits the use of higher operating temperatures and bonding materials which are selected for their acoustical properties only. We have also been able to use non-setting types of acoustical bonding materials in place of the epoxy resins. In addition, we have also used neoprene rubber having an acoustic impedance substantially matched to that of the liquid and which can be obtained commercially from the B. F. Goodrich Industrial Products Company of Akron, Ohio under the trade name "Rho C" rubber. The neoprene is applied in paste form and solidifies in air at room temperatures. Materials other than the epoxy resin and neoprene may be employed so long as the acoustic impedance substantially matches that of the liquid.

Accordingly, it is a principal object of our invention to provide a clamp for piezoelectric ceramic transducers whereby the mechanical ruggedness and operating range are improved without loss in acoustic efficiency.

It is a further object of our invention to provide such a clamp for use with a plurality of transducers.

It is a still further object of our invention to provide such a clamp for use with transducers of all shapes.

Other objects and advantages of our invention will be apparent during the course of the following description.

Broadly, our invention is directed toward obtaining compressional biasing of the bond without acoustic clamping or other effects which would result in a loss in acoustic output. We accomplish this by applying a uniform force to the perimeter of the face of the transducer opposite the bonded face. There is no loss in acoustic efficiency of the transducer as long as the clamping medium is as close to the periphery of the transducer as possible and occupies $\frac{1}{20}$ of the area of the transducer face or less so that the clamping is applied to the outermost edge of the transducer surface.

We have found that an O-ring formed of neoprene or a similarly compliant, strong material is an excellent clamping medium for the purpose. As the diameter of the O-ring is decreased so that it applies pressure more toward the center of the transducer surface, the effect of acoustic clamping becomes pronounced and there is an increase in transducer temperature and a decrease in acoustic output.

In order to apply sufficient force on the O-ring, we use a clamping plate with a very large area in which a groove to receive the O-ring has been cut. The O-ring is aligned in the groove and the clamping plate is pulled up against the transducer by means of bolts which are threaded into nuts or studs welded or otherwise attached to the liquid container. The torque on these studs is adjusted to produce a force of 100 lbs. at each stud (torque=7 in lbs.). Actually, we have found that the torque can be increased until the weld studs break without any decrease in acoustic efficiency.

While the O-ring also serves as an electrical insulator, we have found it better to utilize an insulator of steatite or similar material as a part of the bolt, between the bolt and the clamping plate, or between the bolt and the container. We are thereby able to keep the clamping plate at high potential and the container at ground potential. We have found it convenient to wire the bonded or radiating end of the transducer to the container (ground) and the clamped end to the clamping plate (high potential).

A single clamping plate of our invention may be employed to clamp a plurality of transducers to a liquid container simply and economically. Under these conditions if one of the transducers becomes inoperative due to depolarization or for other reasons, it may be electrically disconnected from the clamping plate and otherwise left clamped in position. This permits operation of the device to be continued without much loss of operating time.

Transducers may also be clamped in closed containers, which are usually submerged in the liquid to be cavitated, by using the teachings of our invention.

Figure 2:
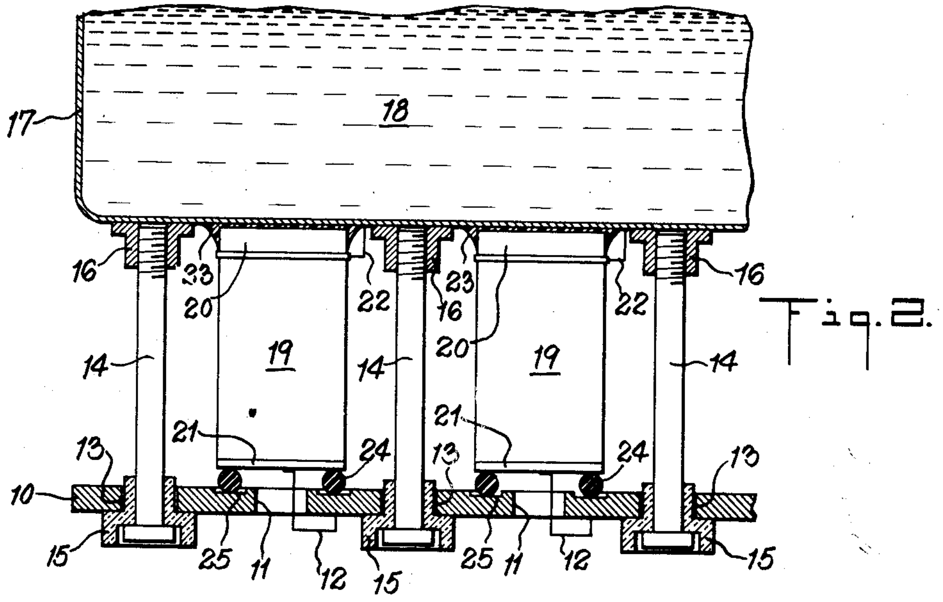
Figure 3:
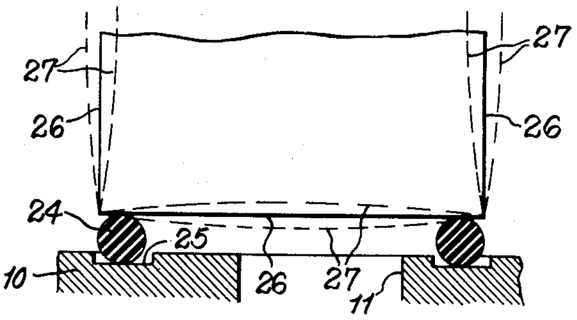
Figure 4:
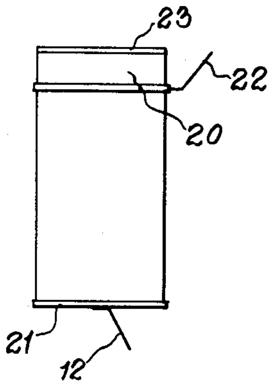
Figure 5:
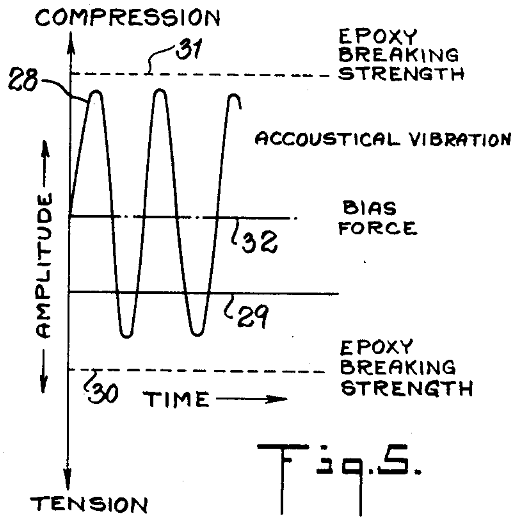
Figure 6:
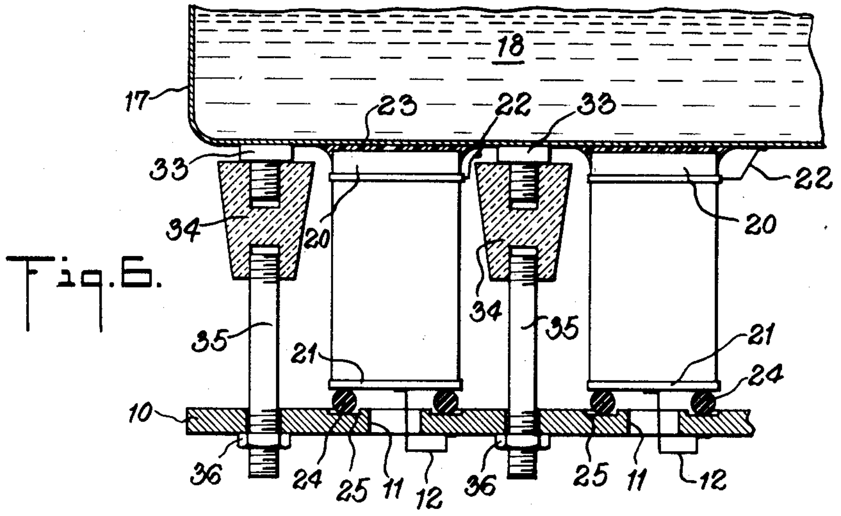
Figure 7:
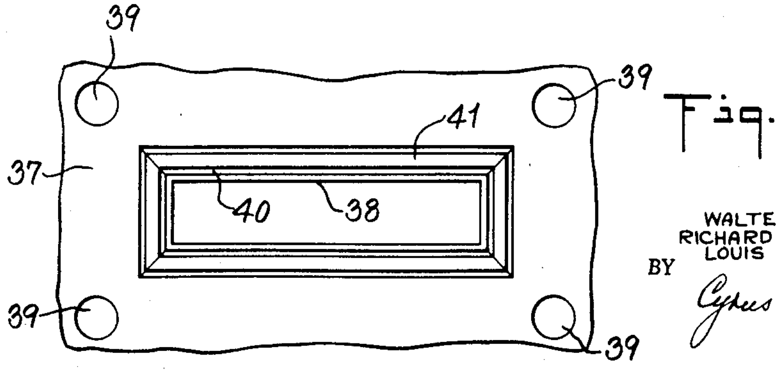
Figure 8:
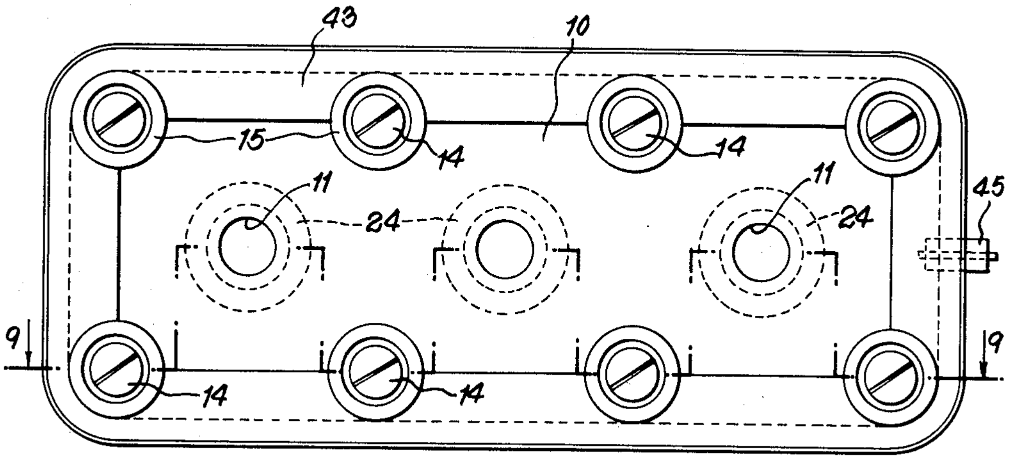
Figure 9:
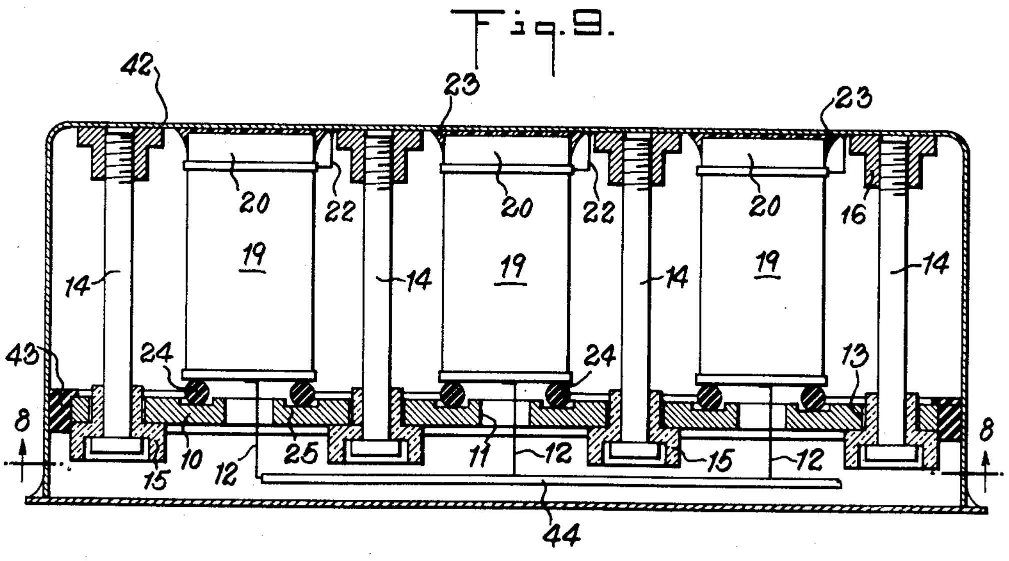

In the accompanying drawings, forming a part of this application, and in which like numerals are employed to designate like parts throughout the same, Figure 1 is a plan view, viewed from below of a portion of the clamping plate of our invention, in place, Figure 2 is a cross-sectional view along the line 2—2 of Figure 1, showing two cylindrical transducers clamped to the bottom of the liquid container, Figure 3 is a diagrammatic view showing the positions assumed by a transducer clamped in accordance with the teachings of our invention, Figure 4 is an elevational view of a transducer employed in the device of our invention, Figure 5 is a graph used to illustrate the theory underlying our invention, Figure 6 is a view similar to Figure 2 of an alternative embodiment of our invention, Figure 7 is a horizontal plan view of a gasket set in a groove in the clamping plate for use with a rectangular parallelepiped transducer, Figure 8 is a view similar to Figure 1, along the line 8—8 of Figure 9, showing a closed container assembly of three transducers mounted in accordance with the teachings of our invention, and Figure 9 is a cross-sectional view of the embodiment of Figure 8 along the lines 9—9 of Figure 8.

In the drawings, wherein, for the purpose of illustration are shown preferred embodiments of our invention, the numeral 10 designates the clamping plate in which are carried holes 11 through which are fed high voltage leads 12. 10 is also furnished with holes 13 through which bolts 14 are fed. Insulators 15 are placed in 13 so that 14 does not make electrical contact with 10. Bolts 14 are threaded into studs 16 which are welded or otherwise affixed to tank 17 in which is contained liquid 18 which is to be cavitated. Transducer 19 is equipped with electrodes 20 and 21, one at each end. 20 is brought down for a small distance around the surface of 19 and glazed except where lead 22 is attached thereto by soldering or otherwise. Lead 12 is affixed by soldering or otherwise to electrode 21 at one end and at the other end to 10. Alternatively, leads 12 may be connected directly to the high voltage side of the ultrasonic generator (not shown) or all leads 12 may be connected to 10 and then to the high side of the ultrasonic generator.

Transducer 19 is bonded to 17 at electrode 20 by means of acoustical matching medium 23. 23 is formed of an epoxy resin such as has been previously described which is applied in liquid form and is allowed to cure for approximately 120 minutes at a temperature of 67° C. Any other material of similar acoustical and mechanical characteristics may also be used.

Transducer 19 is clamped in place by means of bolts 14 and compression is applied on the face of 21 by means of O-ring 24 which is held in position in groove 25 which is carried by plate 10.

In Figure 3, the solid lines 26 of transducer 19 illustrate the position at rest without excitation applied to it and the dotted lines 27 illustrate its extreme positions.

In Figure 5, 28 represents the curve of acoustic vibration of transducer 19, 29 represents the normal axis of the curve of vibration when no force is applied to 23, 30 represents the value of tension breaking strength of 23 and 31 represents the compression breaking strength of 23. 32 is the position of the axis of the curve of vibration when a compressional bias force is applied to 23.

In Figure 6, clamping is accomplished by means of bolt 33 whose head is welded to container 17. Insulator 34 is formed of steatite or similar material and is threaded to receive bolt 33 at one end and to receive threaded rod 35 at the other end. Nut 36 is employed to engage rod 35, which is threaded at both ends, whereby the combination is held in place and 23 and 24 are put in compression.

In Figure 7, which is an upper plan view of plate 37 which is similar to plate 10, are shown hole 38 (similar to hole 11), holes 39 (similar to holes 13), groove 40 (similar to groove 25) and gasket 41 (similar to O-ring 24). In addition to those shown, transducers of other shapes and configurations also lend themselves to the clamping techniques of our invention so long as the gasket or O-ring is applied to the outer periphery of the surface of the transducer and does not cover substantially more than $\frac{1}{20}$ of the surface area of the transducer, and more specifically about $\frac{1}{64}$ of the surface, as in the present illustrative embodiment.

When transducers are to be used in closed, sealed containers and clamped in accordance with the teachings of our invention, it is necessary to place an insulating gasket of rubber or similar material around the perimeter of plates 10 or 37 so that the clamping plate (high potential) does not make contact with the container (ground). The high voltage lead is brought out through an insulated bushing in the container. Such a combination is illustrated in Figures 8 and 9 wherein 42 designates the closed container, 43 is an insulator of neoprene or similar material which serves to insulate plate 10 from container 42, 44 is the high voltage bus to which are connected leads 12 and 45 is an insulator through which 44 is carried and connected to the ultrasonic generator (not shown).

To assemble the combination of Figures 1 and 2, transducers 19 are prepared as illustrated in Figure 4 and are applied to 17 by means of epoxy resin 23 in liquid form. Then plate 10 carrying O-rings 24 is put in place so that leads 12 come out through holes 11. Insulators 15 are placed in holes 13 and bolts 14 are run through 15 and turned so as to be caught in the threads of 16. Now the position of O-rings 24 are checked and when every element is properly positioned, bolts 14 are tightened so that 23 is biased under compression. 23 is permitted to cure and harden, leads 22 are soldered to container 17 and leads 12 are soldered to 10.

The assembly of the combination of Figure 6 is accomplished in similar manner to that described for that of Figures 1 and 2.

In operation, transducers 19, which are driven in length mode (parallel to the axis) by the ultrasonic generator (not shown), vibrate so that they elongate and compress at the excitation frequency and reach the extreme positions illustrated by the dotted lines 27 of Figure 3.

Figure 5 serves to illustrate the theory underlying our invention and is a plot of acoustic vibration amplitude against time. Line 29 represents the axis when no compression is applied to 23 and line 32 represents the axis when 23 is under compression. 30 and 31 represent the epoxy breaking strength under tension and compression, respectively. It can be seen that the amplitude of vibration of 19 as shown in curve 28 may be much greater when 23 is under compression than when it is not without causing the epoxy to break down. For this reason we have been able to achieve higher acoustic efficiency without operating difficulty.

We have found that, by using the techniques taught by our invention, it is possible to attain no change in behavior of transducer operation through a range of torques 0 to 30 in lbs.; the O-ring prevents mechanical rattles in conjunction with coating the threads of the bolts and the epoxy; uniform pressure is obtained around the periphery of the transducer; the epoxy need not possess high tensile strength since it only need have good acoustical transmission qualities; transducers, which become inoperative, may be disconnected without dismantling the assembly and stopping operation for a long period of time; and the clamping plate may be employed to duct cool air driven by a fan over the transducers.

By way of example and without limitation of the scope of our invention, following is a description of a device employing the teachings of our invention.

Transducers 19 are formed of ferroelectric ceramic composed largely of barium titanate. They are cylinders 2″ long by 1.4″ in diameter and have silvered electrodes at each end. One of these electrodes is carried onto the surface for a short distance and glazed as described heretofore. The transducers are polarized longitudinally and operate at 42 kc. with an electrical power of 30 watts (15 acoustical watts). There are 28 of these transducers assembled in a block array spaced 2″ apart from center to center. They are connected so as to be driven in parallel from a 1 kw. ultrasonic generator. The block capacitance of the array is cancelled out by a tuned coil output in the ultrasonic generator.

The load is an 18 gauge stainless steel pan 20″ long x 11" wide x 10" deep and contains approximately 2" to 4" of liquid such as a solution of detergent in water, trichloroethylene and similar materials.

The embodiment illustrated in Figures 8 and 9 is assembled in a manner similar to that employed in the assembly of the embodiment of Figures 1 and 2. After clamping plate 10 and transducers 19 are in place and before 23 is biased under compression, insulator 43 is put in position so that plate 10 and container 42 are electrically insulated from each other. Bolts 14 are tightened so that 23 is biased under compression, 23 is permitted to cure and harden, leads 22 are soldered to 42, leads 12 are connected to bus 44 and 44 is carried through insulator 45. Now the cover is placed on 42 and welded or soldered in place so that the assembly is within a liquid tight container. The combination may now be placed in a liquid such as, for example, a solution of detergent in water and when excitation of the proper frequency and power is supplied by the ultrasonic generator (not shown), the liquid is made to vibrate.

While we have described our invention by means of specific examples and in specific embodiments, we do not wish to be limited thereto, for obvious modifications will occur to those skilled in the art without departing from the spirit of our invention or the scope of the subjoined claims.

Having thus described our invention, we claim:

1. A supporting structure for a piezoelectric transducer comprising a piezoelectric transducer having first and second end surfaces, said transducer being vibratory in its length mode, a substantially rigid plate carrying a plurality of holes and a groove therein, said groove being of approximately the same dimension as the perimeter of the first end surface of the transducer to be supported and whose area is less than approximately $\frac{1}{20}$ the area of said surface; means for making electrical connection to said transducer through one of said holes; a resilient member within said groove and in contact with the first end surface of said transducer; a substantially rigid member at the second end surface of said transducer opposite said rigid plate; acoustic transmission means comprising an epoxy resin in contact with said second end surface of said transducer and said rigid member; means for applying compression between said rigid plate and said rigid member to said transducer through the remainder of said plurality of holes and means for insulating said rigid plate from said rigid member.

2. A supporting structure for a piezoelectric transducer as described in claim 1 wherein the combination is enclosed in a sealed container and including means for insulating said rigid plate from said container and means for making electrical connection through said container to said transducer.

3. A supporting structure for a piezoelectric transducer as described in claim 1 including means for supporting a plurality of transducers between said rigid member and said rigid plate.

4. A supporting structure for a piezoelectric transducer as described in claim 3 wherein one electrode of each of said plurality of transducers is connected to said rigid plate and the second electrode of each of said plurality of transducers is connected to said rigid member.

5. A supporting structure for a piezoelectric transducer as described in claim 3 wherein the combination is enclosed in a sealed container and including means for insulating said rigid plate from said container and means for making electrical connection through said container to said plurality of transducers.

6. A supporting structure for a piezoelectric transducer as described in claim 1 wherein the area of said groove is approximately equal to $\frac{1}{64}$ the area of said first end surface of said transducer.

References Cited in the file of this patent

UNITED STATES PATENTS 2,585,103 Fitzgerald ------------ Feb. 12, 1952

FOREIGN PATENTS 471,902 Italy ---------------- June 3, 1952